(12) United States Patent
Ivarsson

(10) Patent No.: US 6,264,163 B1
(45) Date of Patent: Jul. 24, 2001

(54) VEHICLE SEAT

(75) Inventor: Torsten Ivarsson, Oskarshamn (SE)

(73) Assignee: BE-GE Industri Aktiebolag (SE)

( * ) Notice: Subject to any disclaimer, the term of this patent is extended or adjusted under 35 U.S.C. 154(b) by 0 days.

(21) Appl. No.: 09/242,471

(22) PCT Filed: Aug. 26, 1997

(86) PCT No.: PCT/SE97/01415

§ 371 Date: Feb. 18, 1999

§ 102(e) Date: Feb. 18, 1999

(87) PCT Pub. No.: WO98/08706

PCT Pub. Date: Mar. 5, 1998

(30) Foreign Application Priority Data

Aug. 27, 1996 (SE) .................................................. 9603094

(51) Int. Cl.[7] .................................................. F16M 13/00
(52) U.S. Cl. .......................... 248/588; 248/550; 248/631; 267/64.19
(58) Field of Search .................. 248/588, 561, 248/562, 563, 564, 550, 631, 157, 421, 406.2; 267/64.16, 64.19, 64.27, 345, 131

(56) References Cited

U.S. PATENT DOCUMENTS

| | | | |
|---|---|---|---|
| 4,198,025 | 4/1980 | Lowe et al. ........................... | 248/550 |
| 4,461,444 * | 7/1984 | Grassl et al. ........................... | 248/550 |
| 4,678,155 * | 7/1987 | Carter .................................... | 248/564 |
| 4,684,100 | 8/1987 | Grassl ................................... | 248/550 |
| 4,733,847 | 3/1988 | Grassi ................................... | 248/550 |
| 5,004,206 * | 4/1991 | Anderson .............................. | 248/585 |
| 5,058,852 * | 10/1991 | Meier et al. ........................... | 248/588 |
| 5,169,112 * | 12/1992 | Boyles et al. .......................... | 248/550 |
| 5,222,709 * | 6/1993 | Culley, Jr. et al. ................... | 248/421 |
| 5,234,203 * | 8/1993 | Smith .................................... | 267/131 |
| 5,570,866 * | 11/1996 | Stephens ............................... | 248/631 |
| 5,582,385 * | 12/1996 | Boyle et al. ........................... | 248/550 |
| 5,642,916 * | 7/1997 | Dybro et al. ..................... | 297/216.18 |
| 5,651,585 * | 7/1997 | Van Duser ....................... | 297/344.16 |
| 5,964,455 * | 10/1999 | Catanzarite et al. ................. | 267/131 |

FOREIGN PATENT DOCUMENTS 36 22 521   1/1988 (DE) .
2201659   4/1974 (FR) .

* cited by examiner

Primary Examiner—Anita M. King
(74) Attorney, Agent, or Firm—George T. Marcou; Kilpatrick Stockton LLP

(57) ABSTRACT

The present invention relates to a vehicle seat, which can normally move between a lower end position and an upper end position. The seat comprises a bellows for cushioning/dampening movements of the seat in a vertical direction and also a belt reel which together with a belt is capable of locking the position of the seat at an optional height between the end positions.

6 Claims, 2 Drawing Sheets

VEHICLE SEAT

TECHNICAL FIELD

The present invention relates to a vehicle seat with a seat which can normally move between a lower end position and an upper end position and first means capable of cushioning/dampening movements of the seat in a vertical direction.

BACKGROUND TO THE INVENTION

Driver comfort and ergonomics are areas in which a lot of work and improvements have been made, and especially driver comfort for vehicles in commercial traffic, such as long-distance lorries and buses. Since the vehicle is the driver's workplace, where he spends several hours, it is necessary for comfort and thus the working environment to be as satisfactory as possible. A lot of work has therefore been put into the vehicle suspension on the one hand and the suspension of driver's cabs on the other. Furthermore, driver's seats have been improved as regards possibilities for adjustment to achieve the optimum sitting position and suspension.

However, it has proved to be the case that the suspension of the seat is disadvantageous in certain situations. In the event of heavy braking or collisions, the driver and the seat are exposed to forces directed forwards/upwards, which are amplified by the suspension and height adjustment devices of the seat. Moreover, in certain situations and for certain road conditions the various suspension systems in the vehicle can come to act in opposition, so that the seat suspension system amplifies irregularities instead of dampening these.

DESCRIPTION OF THE INVENTION

The object of the present invention is to provide a device capable of locking the seat at the desired height and blocking the seat's movements when it is exposed to strong acceleration upwards.

This is achieved according to an aspect of the invention by a device for a vehicle seat of the type specified in the introduction, characterised in that the seat comprises means capable of locking the position of the seat cushion at an optional height between said end positions.

According to an aspect of the invention, a seat is provided which also comprises means capable of locking the seat's movement upwards when it is exposed to acceleration in this direction.

These and other aspects and advantages of the present invention will become clear from a detailed description of a preferred embodiment of the invention and the following patent claims.

BRIEF DESCRIPTION OF DRAWINGS

In the following description of a preferred embodiment, reference will be made to the attached drawings, of which

DESCRIPTION OF A PREFERRED EMBODIMENT

Figure 1:
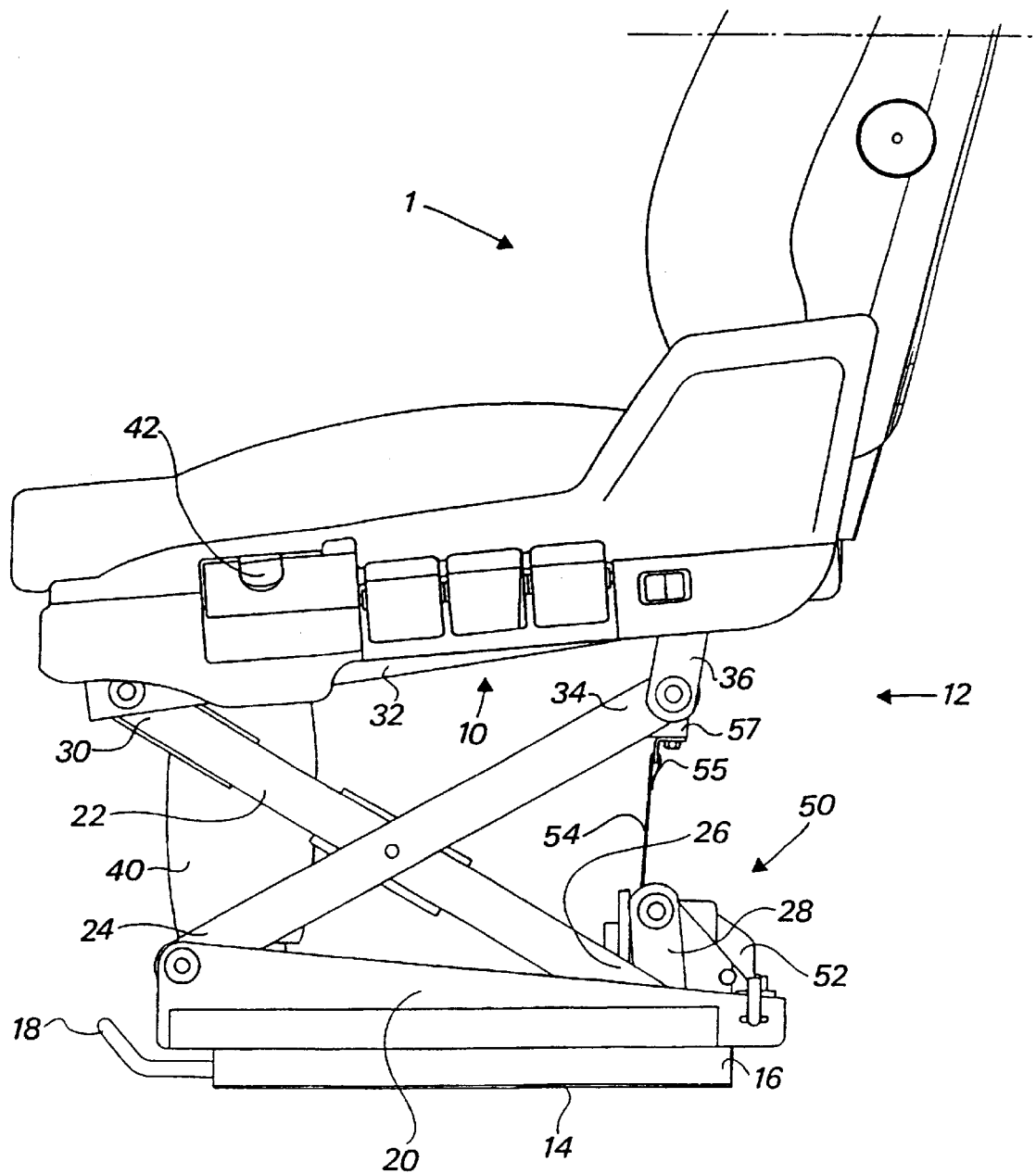
FIG. 1 shows a side view of a vehicle seat in a top end position according to an embodiment of the invention.
Figure 2:
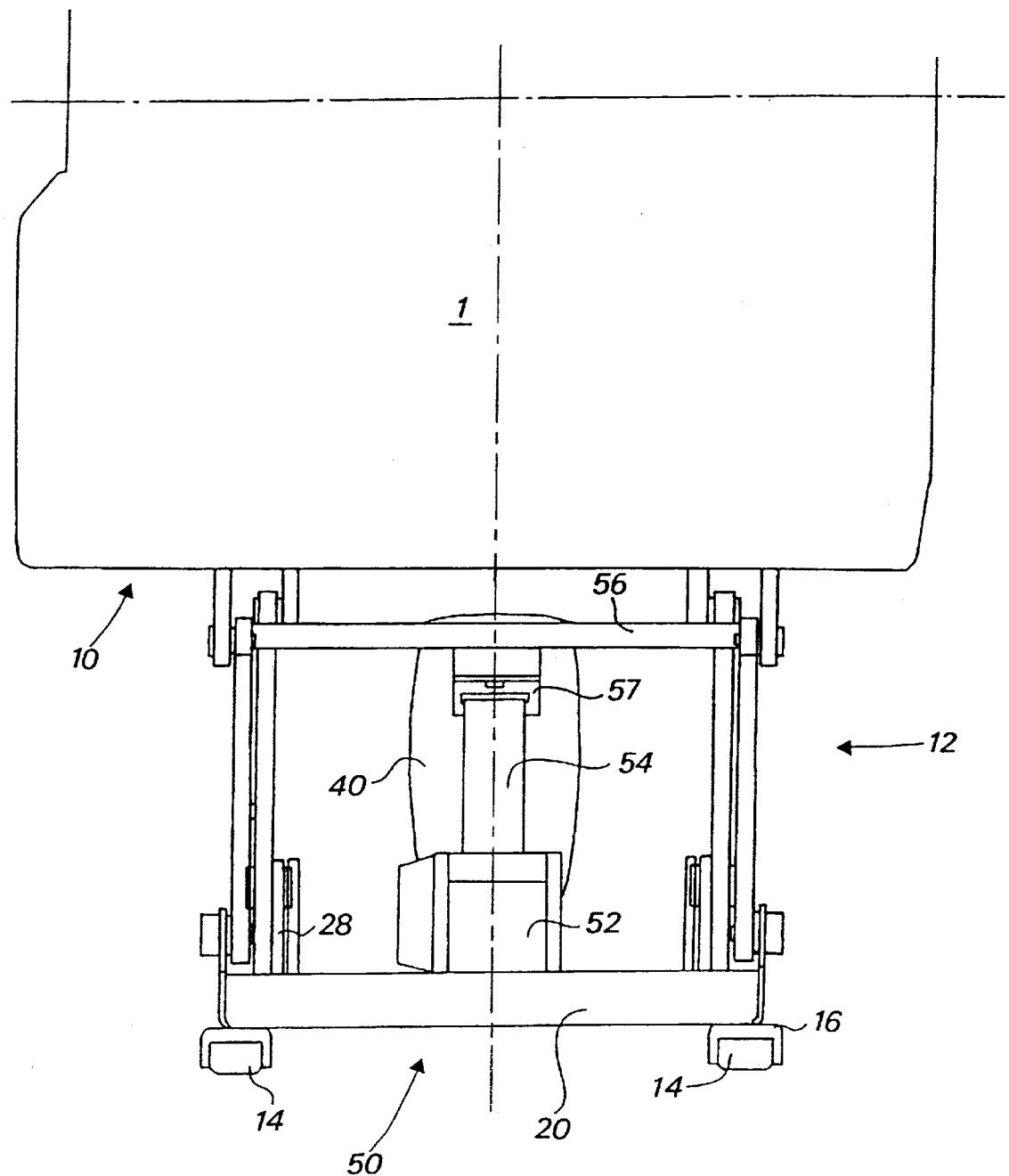
FIG. 2 shows a view from behind of the vehicle seat of FIG. 1.

The drawings show a preferred embodiment of the present invention. It consists of a vehicle seat 1 which comprises a seat 10 arranged on an underbody generally designated by the number 12. The underbody comprises two lower rails 14 affixed to the floor in the vehicle. Arranged displaceably in relation to the lower rails 14 are two upper rails 16, which grip around the lower rails 14 so that they are fixed to one another vertically. The rails 14, 16 are further arranged with a locking device (not shown) for locking in relation to each other in an optional position. The locking device is activated by a handle 18. Firmly attached to the upper rails 16 is a frame 20, to which frame a scissor-type lifting system 22 is attached. The lower front arms 24 of the scissor-type lifters are affixed pivotably to the frame 20 and the lower rear arms 26 to an articulated arm 28, the other end of the articulated arm being arranged pivotably to the frame. The upper front arms 30 are affixed to a frame 32 in the seat 10 and the upper rear arms 34 are arranged pivotably to the seat frame 32 via an articulated arm 36. This scissor-type system allows parallel movement of the seat 10 vertically in relation to the floor.

Arranged between the seat 10 and the frame 20 in their front sections is an air spring 40 in the form of a bellows. The bellows 40 is connected to a pneumatic system (not shown) capable of pressurizing the bellows via a valve which is preferably controlled 42 from the driver's position. By means of the valve the driver can set whether he will admit more air to the bellows 40 or let air out, whereupon the height of the vehicle seat is changed. Disposed between the seat 10 and the frame 20 in their back sections is a locking device 50. In the embodiment shown, it comprises a belt reel 52 affixed to the frame 20 and a belt 54, which is partly rolled up on the reel 52. The belt reel 52 is arranged in the rear part of the underbody 12, i.e. in the part which is opposite the bellows 40 arranged in the front part of the underbody. More precisely, it is arranged on the rear part of the frame 20 midway between the rails 14/16. The other, free, i.e. not rolled-up end 55 of the belt 54 is fastened to the seat 10; in the embodiment shown fastened to a cross-bar 56 between the articulated arms 36. The cross-bar 56 is provided for this purpose with a belt fastening device 57. The belt reel 52 is of the type used for inertia-reel seat belts, i.e. it is disposed with spring elements, which strive constantly to reel the belt into the reel, at the same time as the belt can be pulled out at an even extraction speed. However, if the belt should be pulled out suddenly, a locking function sets in and locks the reel. The belt reel 52 is also arranged according to the invention with a locking mechanism which comes into force on activation, such as an electric impulse for example which locks the reel via an electromagnet.

The device according to the invention is conceived to function as follows. When the driver or passenger gets into the vehicle to drive or ride, he sets a suitable driving height on the seat 10. This is done by activating the valve which controls the flow of air to and from the bellows. The bellows 40 and the scissor-type system 22 then function together with dampening pistons (not shown) as a suspension system of the seat, and in normal movement of the seat 10 in a vertical direction the belt 54 is rolled out of or into the belt reel 52 respectively. However, should a situation arise in which the vehicle is exposed to a violent change of speed, for example powerful braking or collision, the seat 10 will be exposed to powerful acceleration upwards. The belt reel 52 will then lock the belt 54 and thereby prevent the seat from moving upwards relative to the frame 20. This is important, as otherwise the seat's suspension system amplifies the acceleration of the seat and thereby of the person sitting in the seat.

In certain driving situations, the seat suspension can lead to impaired instead of improved driving comfort for the driver. Since a vehicle such as a modern lorry is provided on the one hand with wheel suspension and suspension of the lorry cab on the other and in addition with seat suspension, this can lead in certain types of road states to the suspension system getting out of phase, i.e., instead of dampening an unevenness the seat's suspension amplifies it. In these situations it is desirable to be able to lock the seat's suspension so that the seat 10 remains rigid relative to the frame 20. This is achieved according to the invention by the driver activating the locking mechanism of the belt reel 52, which prevents the belt 54 from being able to be pulled out. The driver then increases the pressure in the bellows 40 so that this will press the seat upwards. Movement is prevented, however, by the belt 54, at which the seat is so to speak "locked" in this position and remains rigid. When the driver wishes to regain the suspension possibilities of the seat, he reduces the pressure at the same time as the locking mechanism in the reel is deactivated.

The function of locking the reel and pressurizing the bellows is preferably integrated into one and the same handle or push-button arranged on the seat for ease of handling.

It is of course also conceivable for locking of the seat to take place by means of some mechanical device, which locks the position between the scissor-type arms, for example, or some additional articulated arrangement which can fix the seat 10 in height.

However, it is an advantage of the device described above that components which are already attached and which are used for other functions, such as the bellows and the belt/belt reel, can also be utilised to obtain a further function, namely fixing of the seat at an optional height.

It should be understood that the invention is not restricted to the embodiment described above and shown in the drawings, but can be modified within the scope of the following patent claims.

What is claimed is:

1. A vehicle seat which can normally move between a lower end position and an upper end position and first means capable of cushioning/dampening movements of the seat in a vertical direction, characterized in that the vehicle seat also comprises second means capable of locking the cushioning/dampening movements of the first means at an optional height position of the seat between said end positions;

wherein said second means for locking the movement of the vehicle seat on acceleration comprises a belt reel and a belt rolled up on the belt reel, and a locking device capable of locking the belt reel when the belt is unrolled in an accelerated manner; and wherein the locking device of the belt reel can be brought to lock the rotation of the belt reel in an optionally desired position, and the position of the seat can be locked in an optional position by locking the rotation of the belt reel and pressurizing bellows so that the bellows is pressed upwards and tensions the belt.

2. The vehicle seat according to claim 1, characterized in that said second means is capable of locking the movement of the seat upwards when the seat is exposed to acceleration in the upwards direction.

3. The vehicle seat according to claim 2, wherein the belt reel and the belt are affixed between the seat and a seat attachment.

4. The vehicle seat according to claim 1, characterized in that said first means capable of cushioning/dampening the seat comprise an air bellows arranged between the seat and a seat attachment arranged to a floor of a vehicle.

5. The vehicle seat according to claim 1, characterized in that said first means are arranged in the vehicle seat's front section, while said second means are arranged in the vehicle seat's rear section.

6. The vehicle seat according to claim 5, characterized in that the centers of the first and second means coincide with the longitudinal center line of the vehicle seat.

* * * * *